United States Patent [19]

O'Shea

[11] 4,384,066
[45] May 17, 1983

[54] IONIC ELASTOMER BLENDS WITH SYNDIOTACTIC POLYBUTADIENE

[75] Inventor: Francis X. O'Shea, Naugatuck, Conn.

[73] Assignee: Uniroyal, Inc., New York, N.Y.

[21] Appl. No.: 292,542

[22] Filed: Aug. 13, 1981

Related U.S. Application Data

[63] Continuation of Ser. No. 209,367, Nov. 24, 1980, Pat. No. 4,332,861.

[51] Int. Cl.³ .............................................. C08K 5/09
[52] U.S. Cl. .................................. 524/394; 524/271; 524/526; 523/167; 525/237
[58] Field of Search ............... 523/167; 524/271, 394, 524/526; 525/237

[56] References Cited

U.S. PATENT DOCUMENTS

| | | | |
|---|---|---|---|
| 3,847,854 | 11/1974 | Canter et al. | 260/23.7 M |
| 3,870,841 | 3/1975 | Makowski et al. | 260/23.7 R |
| 3,974,241 | 8/1976 | Lundberg et al. | 260/897 B |
| 4,000,219 | 12/1976 | Smejkal | 260/876 R |
| 4,151,137 | 4/1979 | Duvdevani et al. | 260/23.5 A |
| 4,257,934 | 3/1981 | O'Mahoney, Jr. | 260/27 BB |

Primary Examiner—Joseph L. Schofer
Assistant Examiner—Bernard Lipman
Attorney, Agent, or Firm—Marvin Bressler

[57] ABSTRACT

A neutralized sulfonated EPDM terpolymer is rendered amenable to adhesion utilizing typical foot sole primer-/adhesive systems by incorporating into the sulfonated EPDM a syndiotactic 1,2-polybutadiene. The composition preferably includes process oils; inorganic fillers and preferential plasticizers for the neutralized sulfonated EPDM terpolymer.

15 Claims, No Drawings

IONIC ELASTOMER BLENDS WITH SYNDIOTACTIC POLYBUTADIENE

This is a continuation of application Ser. No. 209,367, filed Nov. 24, 1980, now U.S. Pat. No. 4,332,861.

BACKGROUND OF THE INVENTION

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically crosslinked elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer. The basic materials used as neutralizing agents are selected from organic amines or basic materials selected from Groups I, II, III, IV, V, VIB, VIIB, and VIII and mixtures thereof of the Periodic Table of Elements.

U.S. Pat. No. 3,836,511, herein incorporated by reference, teaches an improved process for the sulfonation of the olefinic sites of the elastomeric polymer wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming.

U.S. Pat. No. 3,847,854, herein incorporated by reference teaches a method of improving the processability of neutralized sulfonated elastomeric polymers by the addition of a preferential plasticizer which has at least one functional constituent which exhibits a bond moment whose absolute value is at least 0.6 Debye and must be a liquid at the desired processing temperature of the neutralized sulfonated elastomeric polymer.

U.S. Pat. No. 4,151,137, herein incorporated by reference, teaches blend compositions which comprise 100 parts of a neutralized sulfonated EPDM terpolymer, less than about 200 parts per hundred of a paraffinic, low polarity process oil, about 25 to about 200 parts per hundred of an amorphous silica filler, and a preferential plasticizer at about less than 50 parts per hundred based on 100 parts of the sulfonated elastomeric polymer. The compositions may also include a crystalline polyolefinic thermoplastic at less than about 100 parts by weight per 100 parts of sulfonated polymer. These compositions are used for elastomeric articles. This patent teaches that the compositions of the aforementioned patents (U.S. Pat. Nos. 3,642,728; 3,836,511; 3,870,841 and 3,847,854) possess either unsuitable rheological or physical properties for the applications envisioned. For example, their high melt viscosity and melt elasticity make injection molding and extrusion difficult if not impossible. They are generally processable only by compression molding and have unsuitable physical properties for such major applications as footwear and garden hose wherein excellent resilience, dimensional stability, excellent low and high temperature flexibility, excellent flex fatigue and excellent abrasion are needed.

In contrast, the compositions of U.S. Pat. No. 4,151,137 are taught as overcoming the deficiencies of the compositions of the aforementioned U.S. patents from both a rheological and physical aspect and as having desirable rheological and physical properties for the manufacture of elastomeric articles such as elastomeric footwear or garden hose.

A common method of construction for footwear, in particular for casual type footwear, consists of the formation of two separate pieces which subsequently are bonded together with an adhesive. The two pieces are an upper and a lower member. The upper member, which encloses the foot, can be constructed from a variety of materials. Commonly used materials are leather, fabrics and fabrics coated with polymeric resins such as flexible polyvinyl chloride. The lower member, the wearing surface of the shoe, is a molded or die-cut sole and heel and is commonly made from an elastomeric material.

In a prevalent construction method, the sole and heel are one unit generally referred to as a "unit sole". In a particularly efficient production method, the unit sole is injection molded from a thermoplastic elastomer. In this method, no vulcanization is required, scrap can be recycled and high rates of production can be achieved.

In the shoe industry, the technology of adhering the unit sole to the upper member has become highly developed. Adhesive systems have been designed specifically for these applications. Particularly effective adhesives are based on polyurethane resins. These adhesives are commonly one component system consisting of a fully reacted polyurethane elastomer risin in a volatile solvent. A typical example of such an adhesive is Upaco 2400 supplied by Upaco Adhesives, Inc., Nashua, N.H.

In the prevalent method of use the adhesive cement is applied to the surfaces of the upper and lower member which are to be adhered. The solvent is allowed to evaporate and the parts are then heated to a recommended temperature to soften the polyurethane resin. The two surfaces are then pressed together under moderate pressure whereby the polyurethane resin amalgamates and on cooling forms a strong bond which adheres the two members to form the finished shoe. Acceptable service life of this type of footwear requires that the adhesive bond be strong and durable. While polyurethanes have the required strength, they do not adhere equally well to all substrates. In particular, the polyurethanes do not adhere well to non-polar hydrocarbon polymer surfaces.

With the introduction to the industry of hydrocarbon type thermoplastic elastomers such as styrene/butadiene/styrene triblock copolymer resins for unit soles, primers and pretreatments were developed to effectively modify the surface so that an acceptable bond could be achieved with polyurethane type adhesives. A typical example of such primers is Upaco 3213 also supplied by Upaco Adhesives, Inc.

The compositions described in the prior art patent U.S. Pat. No. 4,151,137 possess an exceptional balance of properties for unit soles such as excellent low and elevated temperature flexibility, excellent abrasion resistance, excellent flex fatigue, good resilience, resistance to oils and detergents and rubber-like feel and appearance. However, they have proved to be deficient in adhesive bonding capability using the adhesive systems required for the application even when treated with the primers developed for hydrocarbon-type thermoplastic elastomers. What is required are compositions which provide adhesive bond strength substantially superior to the prior art compositions and serviceable in the unit sole application using the typical primer/adhesive systems just described.

SUMMARY OF THE INVENTION

It has surprisingly been found that compositions comprising 100 parts of a neutralized sulfonated EPDM terpolymer, about 0 to 150 parts per hundred of a low polarity process oil, from zero to about 150 parts of an inorganic particulate filler, about 50 to 150 parts of syndiotactic 1,2-polybutadiene and about 5 to 40 parts of a preferential plasticizer have superior properties for the formation of elastomeric articles and in particular for footwear unit soles formed by a low pressure injection molding process. The particular advantage of these compositions over the prior art compositions resides in the distinctly superior adhesive bonding capabilities to leather and to other materials used in the construction of shoe uppers using adhesive systems conventionally employed in the footwear industry.

DETAILED DESCRIPTION

This invention relates to injection moldable and extrudable elastomeric compositions. The compositions include 100 parts of a neutralized sulfonated EPDM terpolymer, about 0 to 150 parts per hundred of a low polarity process oil, from 0 to about 150 parts of an inorganic particulate filler, about 50 to 150 parts of syndiotactic 1,2-polybutadiene and about 5 to 40 parts of a preferential plasticizer.

These blend compositions can be readily processed on conventional plastics fabrication equipment especially on low and high pressure injection molding or extrusion equipment into elastomeric articles having excellent physical properties and desirable rubbery characteristics. They are especially suitable for fabrication into unit soles for footwear in which they provide beneficial adhesion characteristics to upper materials using conventional adhesion systems.

The EPDM terpolymers of the invention contain ethylene, propylene and a non-conjugated diene in which the ureacted double bond of the diene is present in the side chain. Illustrative method for producing these polymers are found in U.S. Pat. Nos. 3,341,503 and 3,437,645 which are incorporated herein by reference. The polymers contain about 40 to about 80 wt. % ethylene and about 1 to about 10 wt. % diene monomer, the balance of the polymer being propylene. Preferably the polymer contains about 50 to about 70 wt. % ethylene and about 2 to about 7 wt. % diene monomer. For optimum solubility it is preferred that the elastomer have a 212° F. Mooney viscosity of less than 60 (ML-4) although higher molecular weight elastomers may be used.

Illustrative of the non-conjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene.

In carrying out the invention, the elastomeric polymer is dissolved in a non-reactive solvent such as a chlorinated aliphatic hydrocarbon, a chlorinated aromatic hydrocarbon, an aromatic hydrocarbon or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, more preferably at room temperature from about 2 to about 45 minutes and most preferably for about 5 to about 30 minutes. Typical sulfonating agents are described in U.S. Pat. Nos. 3,642,728 and 3,836,511 previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium. The elastomeric polymer is sulfonated at the level of about 5 to about 100 meq. SO$_3$H groups per 100 grams of EPDM, more preferably about 10 to about 50 and most preferably about 10 to about 40.

Neutralization of the sulfonated EPDM is done by the addition of a basic salt to the solution of the sulfonated EPDM. The basic salt is dissolved in a solvent system consisting of an aliphatic alcohol optionally containing some water. The counterion of the basic salt is selected from antimony, aluminum, lead or Groups IA, IIA, IB or IIB of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization.

The compositions of this invention are prepared by blending 100 parts of the above-described neutralized sulfonated EPDM terpolymer with 0 to 150 parts of a low polarity process oil, from zero to about 150 parts of an inorganic particulate filler about 50 to 150 parts of syndiotactic 1,2-polybutadiene and about 5 to 40 parts of a preferential plasticizer.

The oils employed in the present invention are non-polar process oils having less than about 2 weight percent polar type compounds as measured by molecular type clay gel analysis. These oils are selected from paraffinics ASTM type 104B as defined in ASTM-D-2226-70, aromatics ASTM type 102 or naphthenics ASTM type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000 and more preferably about 300 to 750. The preferred process oils are paraffinics. The above described process oils are referred to in the specification and claims as "low polarity process oils".

The inorganic filler may be selected from the group consisting of carbon black, ground and precipitated calcium carbonates, standard and hydrated Kaolin clays, silicas and silicates. Especially preferred are the silicas, particularly ultrafine particle size, precipitated amorphous silica such as HiSil 233.

Syndiotactic 1,2-polybutadiene is a low crystallinity polymer which contains more than 90% of the 1,2-unit, has an average molecular weight exceeding 100,000 and has crystallinity of 15 to 29%. The preferred polymers are RB-810, RB-820 and RB-830, produced by the Japan Synthetic Rubber Company and described by Y. Takeuchi in Plastics Materials, 17 (4), pp. 55-61 (1976).

The neutralized sulfonated EPDM terpolymer cannot ordinarily be worked at conventional processing temperatures. However, certain compounds which act to distrupt the ionic domain of the neutralized sulfonated polymer act as plasticizers in that they permit the sulfonated polymer to be processed at lower temperatures. At the same time these compounds are not plasticizers for other polymers in the composition. Hence they are termed in the specification and claims "preferential plasticizers". Those preferential plasticizers should be selected to have a melting point in the range of the processing temperature to be used.

The preferred preferential plasticizer is selected from carboxylic acid having about 5 to about 30 carbon atoms, more preferably about 8 to about 22 carbon atoms or basic salts of these carboxylic acids wherein the metal ion of the basic salt is selected from the group consisting essentially of aluminum, iron, antimony, lead or Groups IA, IIA, IB or IIB of the Periodic Table of Elements and mixtures thereof. The preferred carboxylic acids are lauric, myristic, palmitic or stearic acids and mixtures thereof, e.g., zinc stearate, magnesium stearate or zinc laurate. The especially preferred preferential plasticizer is zinc stearate.

Alternatively, other preferential plasticizers may be used which are selected from organic esters, phenols, trialkyl phosphates, alcohols, amines, amides, ammonium and amine salts of carboxylic acids and mixtures thereof. Examples of such plasticizers are stearamide, ethylenebis (stearamide), methyl stearate, octadecanol and octadecylamine.

Various other additives can be incorporated into the blend compositions to improve the physical properties, the appearance, the chemical properties of the formed elastomeric article or to modify the processability of the blend composition.

The advantages of the blend compositions of the present invention can be more readily appreciated by reference to the following examples and tables. Unless otherwise specified, all compositions are expressed in parts per hundred by weight.

EXAMPLE 1

A zinc sulfonated EPDM terpolymer having 25 milliequivalents of sulfonate groups per 100 g. of rubber was prepared according to the procedure of U.S. Pat. No. 3,836,511 wherein the sulfonic acid groups were neutralized with zinc acetate. A total of 90 milliequivalents of zinc acetate per 100 g. of rubber was used in the neutralization. The base EPDM terpolymer was an ethylene/propylene/ethylidene norbornene terpolymer with an ethylene content of 51%, a Mooney viscosity at 212° F. of 45 and an iodine number of 8. The zinc sulfonate EPDM was labeled IE-2590.

EXAMPLE 2

Elastomer compounds were prepared in the following way. The ingredients were weighed into a polyethylene bag and kneaded to form a free flowing powder blend. The blend then was charged to a 300 cc. Prepcenter Mixer (Brabender Corp.) and mixed at 80 rpm to a temperature of about 360° F. for five minutes during which a homogeneous polymer melt had been achieved. The mix was then discharged, sheeted off on a warm mill and granulated.

The compounds were molded into 4"×1.5"×0.125" plaques on a ½ ounce Newbury injection molding machine at 360° F. The plaques were cut into 4"×1" strips. The surface was lightly buffed and a 2"×1" area was brushed twice with Primer 3213 (a unit sole halogenation primer from Upaco Corp., Nashua, N.H.). After one hour drying, the treated area was coated with a film of 2400 adhesive (a polyurethane adhesive cement from Upaco Corp.). At the same time, a 2"×1" area of a 3"×1" black patent polyvinyl chloride coated fabric was also coated with the adhesive. After an hour drying time, the FVC coated fabric was adhered to the samples by heating the pieces for 45 seconds in a 50° C. oven and pressing the adhesive coated surfaces together for 15 seconds under 90 lbs./sq. in. pressure. The test pieces were then aged for 72 hours at 50° C., cooled, and tested for adhesion by pulling the fabric from the sample at a 180° angle between the jaws of an Instron tester at 2"/min.

The data shown in Table I clearly demonstrate the dramatic effect of 1,2-syndiotactic polybutadiene on adhesion bond strength. Little or no adhesion is obtained when it is absent or when polypropylene is used in its place. It also exerts a beneficial effect on melt viscosity. The unexpected advantage of 1,2-syndiotactic polybutadiene over elastomeric cis-polybutadiene is seen in the comparison of sample IE and IF. The 1,2-syndiotactic polybutadiene exhibits superior hardness, tensile strength, elongation, melt viscosity and adhesion bond strength.

TABLE I

| | A | B | C | D | E | F |
|---|---|---|---|---|---|---|
| IE-2590 | 100 | 100 | 100 | 100 | 100 | 100 |
| Tufflo 6056 Oil[1] | 125 | 125 | 125 | 125 | 120 | 120 |
| HiSil 233[2] | 50 | 50 | 50 | 50 | 60 | 60 |
| RB-820[3] | 75 | — | — | — | 130 | — |
| Profax 6323[4] | — | — | 25 | 75 | — | — |
| Cis-Polybutadiene | — | — | — | — | — | 130 |
| Zinc Stearate | 20 | 20 | 20 | 20 | 20 | 20 |
| Naugard 445[5] | 1.6 | 1.2 | 1.4 | 1.2 | 1.8 | 1.8 |
| Shore A | 56 | 41 | 53 | 82 | 65 | 29 |
| 100% Modulus | 220 | 140 | 230 | 490 | 280 | 65 |
| Tensile | 570 | 680 | 820 | 990 | 630 | 112 |
| Elongation | 560 | 700 | 730 | 620 | 560 | 260 |
| App. Visc. @ 100 sec$^{-1}$, Poise × $10^{-4}$ | 4.8 | 8.1 | 4.6 | 4.0 | 4.8 | 10 |
| Adhesion, | 18 | 1 | 1 | 1 | 34 | 5 |

TABLE I-continued

| | A | B | C | D | E | F |
|---|---|---|---|---|---|---|
| Lbs./in. | | | | | | |

[1]Paraffinic processing oil
[2]Silica
[3]Syndiotactic 1,2-polybutadiene
[4]Polypropylene-twelve MFI
[5]Antioxidant-akylated diphenyl amine

EXAMPLE 3

In the same manner as described in Example 2, additional compounds were prepared and tested to demonstrate the scope of this invention. Data on these compounds are shown in Table II.

TABLE II

| | A | B | C | D | E | F | G | H | I |
|---|---|---|---|---|---|---|---|---|---|
| | 100 | 100 | 100 | 100 | 100 | 100 | 100 | 100 | 100 |
| Tufflo 6056 | 80 | 110 | 110 | 130 | 110 | 120 | 110 | 110 | 85 |
| HiSil 233 | 50 | 50 | 50 | 50 | 70 | 40 | 30 | 50 | — |
| Imsil A-108[1] | — | — | — | — | — | — | — | — | 138 |
| RB-820 | 80 | 80 | 80 | 110 | 110 | 130 | 110 | 150 | 25 |
| Zinc Stearate | 20 | 10 | 30 | 20 | 20 | 20 | 20 | 20 | 20 |
| Irganox 1010[2] | 1.4 | 1.5 | 1.6 | 1.8 | 1.7 | 1.9 | 1.7 | 1.9 | 0.7 |
| Shore A | 65 | 56 | 61 | 59 | 65 | 63 | 62 | 69 | 58 |
| 100% Modulus | 310 | 270 | 270 | 250 | 290 | 280 | 270 | 330 | 290 |
| Tensile | 870 | 620 | 730 | 570 | 720 | 630 | 650 | 700 | 630 |
| Elongation | 600 | 360 | 600 | 540 | 610 | 540 | 550 | 600 | 370 |
| Adhesion, lbs./in. | 29 | 22 | 12 | 23 | 40 | 23 | 16 | 37 | 18 |
| App. Visc. @ 100 sec.[1], poise × $10^{-4}$ | 9.2 | 9.5 | 5.3 | 4.0 | 6.5 | 4.0 | 4.0 | 5.3 | — |

[1]amorphous silica
[2]antioxidant

What is claimed is:

1. A composition comprising:
   (a) a neutralized sulfonated EPDM terpolymer;
   (b) about 50 to about 150 parts per hundred parts of terpolymer of a syndiotactic 1,2-polybutadiene;
   (c) about 5 to about 40 parts per hundred parts of terpolymer of a preferential plasticizer;
   (d) 0 to about 150 parts per hundred parts of terpolymer of an inorganic particulate filler; and
   (e) 0 to about 150 parts per hundred parts of terpolymer of a low polarity process oil.

2. The composition according to claim 1 wherein about 50 to about 150 parts per hundred based on the terpolymer of a low polarity process oil is incorporated therein.

3. The composition of claim 1 or 2 wherein the inorganic filler is amorphous silica.

4. The composition according to claim 1 wherein the non-conjugated diene of the EPDM terpolymer is 5-ethylidene-2-norbornene.

5. The composition according to claim 1 wherein the neutralized sulfonated EPDM terpolymer is a zinc sulfonate.

6. The composition of claim 1 wherein the preferential plasticizer is a metal stearate wherein the metal is zinc or magnesium.

7. The composition according to claim 2 wherein the process oil is incorporated at about 75 to about 130 parts per hundred.

8. The composition of claim 7 wherein the process oil is incorporated at about 100 to about 125 parts per hundred.

9. The composition of claims 1 or 2 wherein the syndiotactic polybutadiene is incorporated at about 60 to about 140 parts per hundred.

10. The composition according to claim 9 wherein the syndiotactic polybutadiene is incorporated at about 75 to about 130 per hundred.

11. The composition according to claim 1 or 2 wherein the inorganic filler is incorporated at about 20 to about 120 parts per hundred.

12. The composition according to claim 11 wherein the inorganic filler is incorporated at about 40 to about 75 parts per hundred.

13. The composition according to claim 1 or 2 wherein the preferential plasticizer is incorporated at about 10 to about 30 parts per hundred.

14. The composition according to claim 13 wherein the preferential plasticizer is incorporated at about 20 parts per hundred.

15. A footwear shoe sole made from the composition of claim 1.

* * * * *